United States Patent [19]

Dey

[11] 4,080,489

[45] Mar. 21, 1978

[54] MEANS FOR IMPROVING CONTACT BETWEEN II AND THE ANODE CURRENT COLLECTOR

[75] Inventor: Arabinda N. Dey, Needham, Mass.

[73] Assignee: P. R. Mallory & Co. Inc., Indianapolis, Ind.

[21] Appl. No.: 664,782

[22] Filed: Mar. 8, 1976

Related U.S. Application Data

[63] Continuation-in-part of Ser. No. 664,780, Mar. 8, 1976, Pat. No. 4,028,138.

[51] Int. Cl.² ............................................. H01M 4/02
[52] U.S. Cl. .................................... 429/211; 429/218

[58] Field of Search .............................. 136/20, 120 R; 29/196.2, 196.4, 196.5, 196.6, 197–199; 75/66, 134 A; 427/89, 125, 250, 328, 367, 383, 405; 429/211, 218

[56] References Cited

U.S. PATENT DOCUMENTS

| 3,881,951 | 5/1975 | McCoy | 136/120 R |
|---|---|---|---|
| 3,957,532 | 5/1976 | Settle et al. | 75/134 A |

Primary Examiner—Charles F. LeFevour
Attorney, Agent, or Firm—Ronald S. Cornell; Israel Nissenbaum; C. W. Hoffmann

[57] ABSTRACT

An alkali metal anode compressed on a smooth metal current collector and adhered thereto by means of a metal which spontaneously alloys with the alkali metal at room temperature.

5 Claims, 1 Drawing Figure

U.S. Patent
March 21, 1978
4,080,489
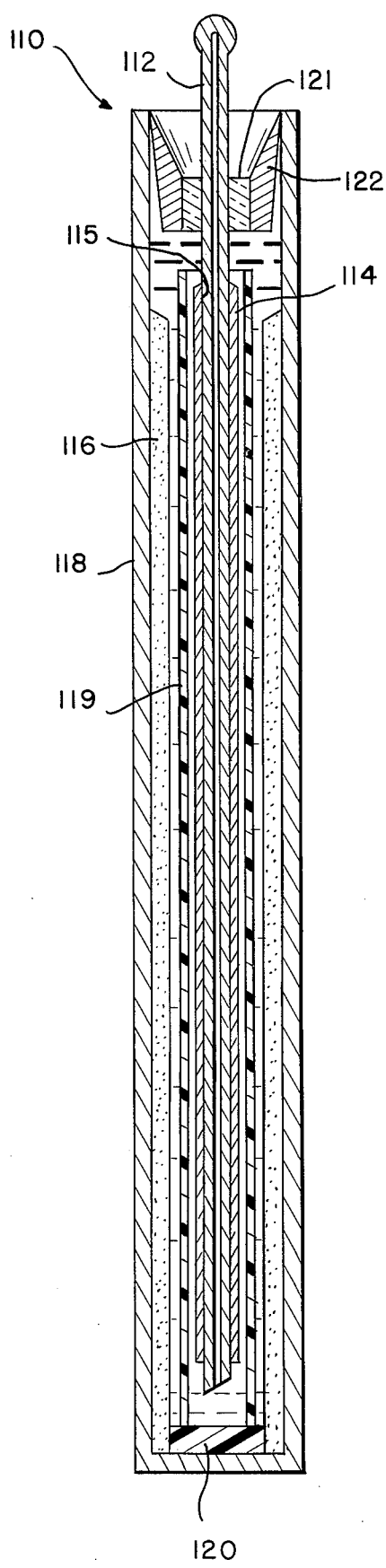

4,080,489

MEANS FOR IMPROVING CONTACT BETWEEN LI AND THE ANODE CURRENT COLLECTOR

This is a continuation-in-part of my copending application Ser. No. 664,780, filed Mar. 8, 1976, and now U.S. Pat. No. 4,028,138 issued on June 6, 1977.

This invention relates to current collectors for alkali metals, especially lithium, which are used as anodes in electrochemical cells.

Anode current collectors generally serve the dual function of providing a base support for the active anode material and of being electronically conductive to provide a pathway for the flow of electrons which provide the energy of the electrochemical cell. The production of alkali metal anodes, for high energy density cells, with current collectors has in the past generally fit into one of two categories. Either the current collector consisted of an expanded mesh metal such as stainless steel, nickel or other material inert to the alkali metal, or the current collector was a smooth metallic surface material such as the cell container itself. The expanded mesh metals provided good mechanical support for the alkali metal anode material by the simple expedient of pressing the comparatively soft alkali metal onto the expanded mesh, adhesion being achieved by virtue of the alkali metal being enbedded in the openings of the mesh material. However, when alkali metals are pressed onto a metallic surface, especially a smooth metallic surface, and such surface is to provide the major support for the alkali metal, cell performance is deleteriously affected because of poor adhesion between the alkali metal and the current collector. It is believed that surface films, such as oxides or nitrides, on the alkali metal hinder adhesion with resulting possible displacement of the alkali metal, reduced electrical contact, and loss of cell capacity.

It is therefore an object of the present invention to provide a means by which lithium or other alkali metals such as sodium and potassium can be adherent affixed to a smooth metallic surface in an electrochemical cell.

It is another object of this invention to provide a means by which the adhesion and electrical contact between lithium or other alkali metals and a metallic mesh can be improved.

It is yet another object to provide an anode current collector embodying such means and the incorporation of this current collector within an electrochemical cell.

These and other advantages and improvements can be discerned from the drawing as well as from the examples which are set forth below in which the single FIGURE in the drawing is a side sectional view of an electrochemical cell utilizing the features of the present invention.

Anode current collectors commonly used with lithium or other alkali metals, such as stainless steel, cold rolled steel, nickel, tantalum, titanium and copper, whether as the cell container or as separate current collectors, provide poor adhesion bases for the alkali metals which are normally simply pressed on to their surfaces, especially if the surfaces are smooth. Adhesion can be greatly improved, however, if prior to placement of the lithium (which is usually the preferred active anode material because of its high energy density) on the current collector the collector is plated with a metal which is capable of spontaneously alloying with the alkali metal at ambient or room temperatures. Thus good mechanical and electrical adhesion between the plated current collector and the alkali metal can be achieved by simple compression of the alkali metal on the current collector with the adhesion operating in the same manner as an amalgamation. Additionally, this good contact can be attained without the use of expensive, cumbersome, and sometimes unreliable methods such as welding.

It should also be noted that an efficient anode with current collector can be made only if the alloyable material is present as a thin plate on a current collector substrate material which is substantially inert to the alkali metal. If the entire anode current collector were made of the alloyable material cell performance would suffer as a result of total alloying with concomitant deterioration of the mechanical strength of the current collector and/or a diminishing of the electrochemical utility of the alkali metal as anode.

Even the contact properties of current collectors made of expanded metal or metal mesh can be improved by plating them with the alloyable metal. This improvement in the connection is caused by the improved electrical connection resulting from the alloying which breaks apart the oxide or other films on the alkali metal surface.

Examples of metals which readily alloy with lithium and other alkali metals at ambient temperatures and which are therefore useful in the present invention include mercury, silver, aluminum, cadmium, magnesium, zinc, lead, tin, platinum and gold, with gold being preferred because of its superior plating characteristics.

The layer of the alloyable material need only be of minimal thickness and the amount of surface area of the current collector to be plated need only be sufficient to support the alkali metal or provide for improved electrical contact to the degree necessitated by cell structure and discharge requirements.

The preferred process for applying the alloyable material to the current collector is electroplating. However, other methods of plating or formation of the alloyable layer such as vacuum deposition are also within the contemplation of the present invention.

The following Examples are given to enable those skilled in the art to more clearly understand and practice the present invention. They should not be considered as a limitation of the scope of the invention but merely as being illustrative and representative thereof.

EXAMPLE I

An example of a cell utilizing a plated current collector and a lithium active anode material is shown in the drawing as cell 110 having a dimension of about 0.1 inch outer diameter and 0.75 inch height. A stainless steel hollow needle or tube 112 closed at its upper end serves as the current collector for cell 110 and as mechanical support for a layer of lithium 114. This cell, as more fully described in my parent application Ser. No. 664,780 and now U.S. Pat. No. 4,028,138, has a polypropylene separator 119 and an active cathode layer of silver chromate 116. The cell container of stainless steel 118 is hermetically sealed by rings 121 and 122, with the former being of glass and the latter of metallic composition. The glass ring 121 is sealed to hollow tube 112 and to metal ring 122. Metal ring 122 is welded to the can at its upper end thereby completing the hermetic seal of the cell.

The construction of the cell requires that the current collector 112 mechanically support the lithium metal 114. The smooth surface of hollow tube 114 inhibits adherence, however, and the lithium would therefore ordinarily tend to slide during the cell construction. This would result in poor cell performance. Common adherance methods such as welding, in a cell of this size, are unwieldy and impractical. However, by electroplating a thin layer of gold (shown as the alloying interface, 115 between the lithium 114 and the current collector 112) on the stainless steel tube current collector 112 prior to emplacement of the lithium on the hollow tube, good adhesion is obtained and the improved mechanical and electrical contact results in better cell performance. The above cell utilizes an organic solution of one molar lithium perchlorate dissolved in an equivolume mixture of propylene carbonate and tetrahydrofuran. However, inorganic cells utilizing other materials such as sulfur dioxide and thionyl chloride, or any other cell having a lithium or other alkali metal anode on a metallic current collector can be improved in terms of cell performance as a result of the improved anode structure of the present invention.

EXAMPLE II

A particularly efficient plated anode current collector is formed by plating a copper substrate current collector with a layer of mercury by electrodeposition. Lithium is then placed on the mercury coated, copper current collector and adheres thereto very rapidly with a minimum of pressure being applied. The mercury forms an amalgam with the copper and the lithium.

While the present invention has been described with reference to specific embodiments thereof, it will be understood by those skilled in the art that various changes can be made with respect to the component materials of the anode, anode current collector and plating material without departing from the true spirit and scope of the invention.

What is claimed is:

1. An anode for use in a high energy density electrochemical cell, said anode comprising an alkali metal as anode active material compressed on a smooth metallic current collector which comprises a metal which is substantially inert to said alkali metal; and, as an intermediate layer of minimal thickness between said alkali metal and said metallic current collector, an alloy comprising said alkali metal and a metal capable of spontaneously alloying with said alkali metal at room temperature; wherein said alkali metal is adhered to said metallic current collector by means of said alloy.

2. An anode as in claim 1 wherein said alkali metal is lithium.

3. An anode as in claim 2 wherein said current collector comprises stainless steel and said spontaneously alloying metal is gold.

4. An anode as in claim 1 wherein said metallic current collector comprises a metal selected from the group consisting of stainless steel, cold rolled steel, nickel, tantalum, titanium and copper.

5. An anode as in claim 1 wherein said spontaneously alloying metal is selected from the group consisting of mercury, silver, aluminum, cadmium, magnesium, zinc, lead, tin, platinum and gold.

* * * * *